United States Patent [19]

Edgar et al.

[11] Patent Number: 5,547,650
[45] Date of Patent: Aug. 20, 1996

[54] PROCESS FOR REMOVAL OF OXIDES OF NITROGEN

[75] Inventors: Bradley Edgar, Berkeley; Robert W. Dibble, Livermore, both of Calif.

[73] Assignee: The Regents of the University of California, Oakland, Calif.

[21] Appl. No.: 217,783

[22] Filed: Mar. 24, 1994

[51] Int. Cl.$^6$ .................................................. C01B 21/00
[52] U.S. Cl. ............................................ 423/235; 423/212
[58] Field of Search ............................... 423/212 R, 235, 423/351; 204/157.46

[56] References Cited

U.S. PATENT DOCUMENTS

| | | |
|---|---|---|
| 3,770,385 | 11/1973 | Grey et al. . |
| 3,900,554 | 8/1975 | Lyon . |
| 3,981,815 | 9/1976 | Taniguchi et al. . |
| 4,405,587 | 9/1983 | McGill et al. ............................ 423/235 |
| 4,507,269 | 3/1985 | Dean et al. . |
| 4,824,646 | 4/1989 | Haskell . |
| 4,954,323 | 9/1990 | Sockell . |
| 4,961,830 | 10/1990 | Aoki et al. . |
| 5,020,457 | 6/1991 | Mathur et al. . |
| 5,041,271 | 8/1991 | Aoki et al. . |
| 5,048,432 | 9/1991 | Hofmann et al. . |
| 5,078,973 | 1/1992 | Kuroda et al. . |
| 5,137,703 | 8/1992 | Lichtin et al. ............................ 423/351 |
| 5,324,492 | 6/1994 | Masuda et al. ..................... 204/157.46 |
| 5,399,326 | 3/1995 | Young ...................................... 423/235 |
| 5,478,542 | 12/1995 | Chawla .................................... 423/235 |

FOREIGN PATENT DOCUMENTS 7900413   7/1979   WIPO .

OTHER PUBLICATIONS

Chan, A. K. F. et al., *An electrically efficient, finely tunable, low–power plasma generator*, J. Phys. D: Appl. Phys., 13 (1980) 2309–20.

Hilliard, J. C. & Weinberg, F. J., *Effect of nitrogen–containing plasmas on stability, NO formation and sooting of flames*, Nature, 259 (1976) 556–557.

Edgar, B. L. & Dibble, R. W., *TurboNO$_x$: A Process for Efficient and Economical Removal of NO$_x$ from Low Temperature Exhaust* (Poster Presentation, 1992).

*Primary Examiner*—Wayne Langel
*Attorney, Agent, or Firm*—Fish & Richardson, P.C.

[57] ABSTRACT

An improved process for SNCR of NO$_x$ is provided. The exhaust gases from a combustion source are fed to a reducing reactor. A NO$_x$ reductant is injected into the exhaust to form a mixture. The mixture is then heated by regenerative heating to effect NO$_x$ reduction reactions. The reacted exhaust may then be further heated to remove byproducts, such as N$_2$O, and unreacted reductant.

9 Claims, 7 Drawing Sheets

FIG. 5A
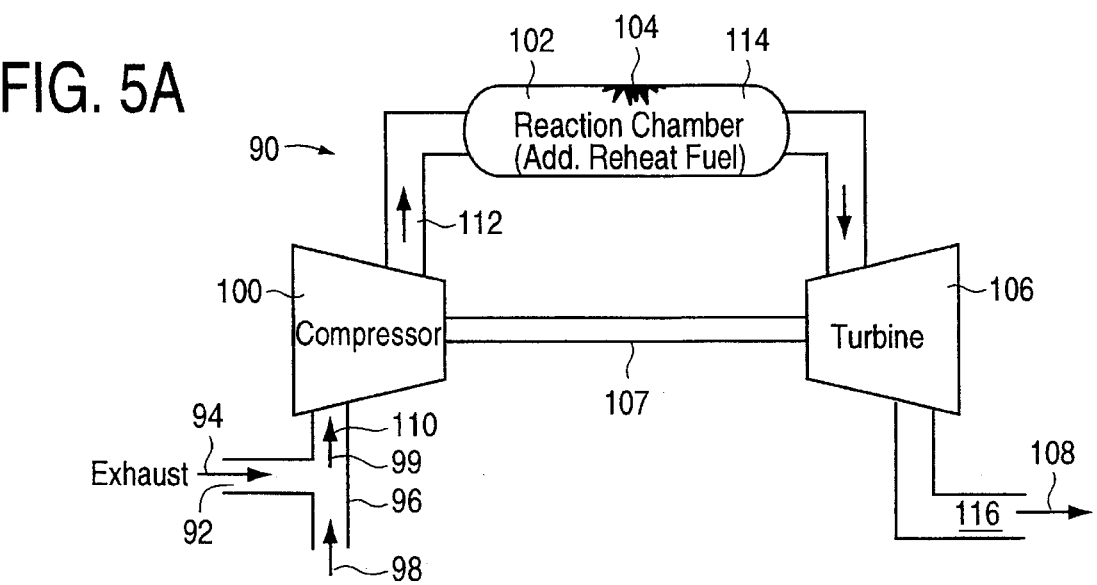
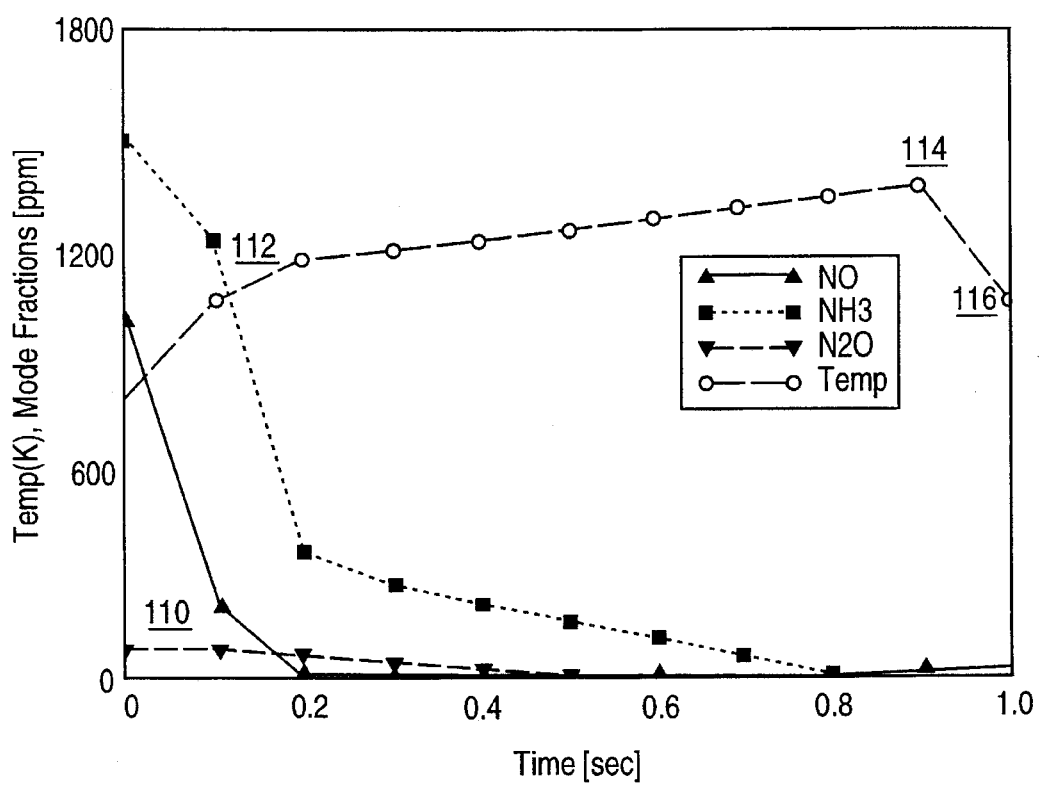
FIG. 5B

PROCESS FOR REMOVAL OF OXIDES OF NITROGEN

BACKGROUND OF THE INVENTION

The present invention relates generally to gas phase removal of oxides of nitrogen ($NO_x$), and more particularly to a process for reduction of $NO_x$ in engine and power plant exhaust gases.

The invention is directed to a $NO_x$ control process applicable to a variety of industrial combustion sources, such as diesel power generators, gas turbines, glass and metal melting furnaces, incinerators, chemical processing plants, and refineries. Many of these sources have not been amenable to conventional emission control techniques. The process of the invention is particularly applicable to $NO_x$ control from lean burn engines, including diesel and spark ignited engines.

Lean burn engines pose particularly challenging problems in terms of $NO_x$ control. Diesel engines, for example, are the most efficient engines and thus produce the least amount of the greenhouse gas carbon dioxide ($CO_2$) for energy delivered. However, the diesel engine also produces the most $NO_x$ for energy delivered and, consequently, its use as a power source is being discouraged.

Currently, large stationary diesel engines are used in a variety of industrial applications including cogeneration, natural gas pumping, and emergency power generation for nuclear power plants. These large engines are also fairly high emitters of $NO_x$, $NO_x$ levels being typically 500–1000 parts-per-million by volume (ppm) in a flue gas with an oxygen ($O_2$) concentration of 10%. For comparison, coal-fired utility boilers will emit $NO_x$ at levels of 250–600 ppm at an $O_2$ level of 3%. Controlling $NO_x$ emissions from these diesel engines cannot be achieved by modifying aspects of engine operation, such as injection timing or the amount of pilot fuel, while maintaining satisfactory performance. Accordingly, in order to reduce polluting emissions, engine manufacturers set engine operating parameters to simultaneously lower $NO_x$, and other undesirable exhaust constituents, such as carbon monoxide (CO), hydrocarbons and soot, thereby compromising engine performance. Moreover, enthusiasm for the adiabatic diesel engine, one that would use high temperature ceramic parts, has been mitigated by the knowledge that the high thermal efficiency associated with this engine will lead to increased $NO_x$ production.

In recent years, cogeneration has been implemented nationwide as a step towards energy conservation. Cogeneration projects have utilized a variety of prime movers and combustion sources, including diesel engines and gas turbines. Like diesel engines, exhaust from gas turbine engines has posed a challenge for emissions control. In addition, in some cases, these facilities burn waste fuels for which little emission control-information is available. Accordingly, while such relatively small cogeneration projects (in comparison to utility scale combustion systems) have contributed to energy conservation, they have, at the same time, posed emission control problems.

In addition to the engine and power plant emission problems, there has been increasing pressure to control emissions from industrial processes such as melting operations, refineries, chemical processing plants, and toxic and hazardous waste incinerators. Glass furnaces, for example, pose a particularly difficult problem for application of flue gas $NO_x$ control due to the potentially corrosive and noxious sodium sulfates present in their exhausts.

The above-noted combustion sources pose particular problems for emissions control due to the temperature, and gaseous and particulate content of their exhausts. Thus, there is a need to address the air pollution control problems facing such combustion sources.

Other than expensive wet scrubbing systems, post-combustion technologies have focused on non-selective gas phase $NO_x$ reduction, ammonia based selective catalytic reduction (SCR), and selective non-catalytic reduction (SNCR) using ammonia ($NH_3$), urea, cyanuric acid, isocyanate, hydrazine, ammonium sulfate, atomic nitrogen, malamine, methyl amines or bi-urates.

The first of these technologies, non-selective gas phase $NO_x$ reduction, involves injection of a $NO_x$ reducing agent, or reductant, such as methane or another hydrocarbon. However, the compound will not only react with $NO_x$ but also with oxygen present in the exhaust. This requires that sufficient reductant be injected to consume both the $NO_x$ and the oxygen. This treatment approach is most applicable to combustion systems operating at fuel/air ratios near stoichiometric, where low less fuel is required to reduce the oxygen. This approach is inappropriate for diesel engines, for example, where oxygen concentrations vary from approximately 8–14%. Moreover, the considerable addition of fuel required for this method renders it prohibitively expensive in many applications.

A second approach, selective catalytic $NO_x$ reduction (SCR), involves the reduction of $NO_x$ by ammonia ($NH_3$) over a catalyst. Catalysts are typically titanium dioxide and vanadium pentaoxide, or zeolites. The catalysts operate in a temperature region between about 550° F.–800° F. While selective catalytic $NO_x$ reduction is capable of high levels of $NO_x$ removal, the process is not without drawbacks: Catalyst cost is high, catalysts oxidize sulfur in the fuel to sulfate ($SO_3$), and reactions between $SO_3$ and residual ammonia ($NH_3$) can cause problems with downstream equipment. Furthermore, the temperature of the exhaust must be in the range of 550°–800° F., and since the catalyst is subject to poisoning and deactivation, catalyst life is uncertain. In addition, catalyst induced pressure drop can interfere with engine operation. Finally, the spent catalyst may be classified as a hazardous substance subject to strict transportation and disposal regulations.

A number of the issues enumerated above are particularly applicable to the diesel or gas turbine engines and other industrial combustion processes. Typical engine exhaust temperatures for these combustors are on the order of 1000° F. To apply SCR, heat extraction is required to provide the proper temperature for reaction, in addition to heat recovery downstream of the SCR reactor to provide overall energy recovery. Thus, in a combined cycle system the SCR reactor would be in the middle of the waste heat recovery boiler.

More importantly, during some operating modes, diesel engines, gas turbines and other industrial combustors can emit carbon particulates or lubrication oil, which, if carried over in the exhaust, can lead to catalyst deactivation. This can make the process both economically unattractive and operationally difficult. Thus, while SCR is being applied to boiler exhausts and gas turbine exhausts, its application to the exhausts of such combustors on a widespread basis has met with resistance.

A third approach is selective non-catalytic reduction of $NO_x$ (SNCR). A number of processes fall within this category, each involving the injection of a chemical that selectively reacts, in the gas phase, with $NO_x$ in the presence of oxygen at a temperature greater than 1150° F. Chemical $NO_x$ reduction agents used in such processes include ammonia ($NH_3$), urea ($NH_2CONH_2$), cyanuric acid $(HNCO)_3$, iso-cyanate, hydrazene, ammonium sulfate, atomic nitrogen, malamine, methyl amines, or bi-urates.

While the detailed chemistry of the processes listed above varies, the overall chemistry is best illustrated by considering the reactions between $NH_3$ and the oxide of nitrogen, nitric oxide (NO). Upon injection, the $NH_3$ breaks down to form $NH_2$ radicals primarily by the reaction $$NH_3 + OH \rightarrow NH_2 + H_2O \quad (1)$$

The NO is then primarily removed by reaction with $NH_2$ radicals according to the following:

$$NH_2 + NO \rightarrow N_2 + H_2O \quad (2)$$

$$NH_2 + NO \rightarrow N_2 + H + OH \quad (3)$$

Another oxide of nitrogen present in combustion exhaust is nitrogen dioxide ($NO_2$). Removal of $NO_2$ also occurs according to the same chemistry, since $NO_2$ is converted to NO by the following reaction:

$$NO_2 + H \rightarrow NO + OH \quad (4)$$

The OH is subsequently replenished through the reverse of reaction (1) and the following $H_2$–$O_2$ system reactions:

$$H + O_2 \rightarrow OH + O \quad (5)$$

$$O + H_2 \rightarrow OH + H \quad (6)$$

$$O + H_2O \rightarrow OH + OH \quad (7)$$

Since reactions (5) and (7) are strongly temperature dependent, OH is not replenished fast enough to convert $NH_3$ to $NH_2$ at temperatures below approximately 1500° F., in the available reaction time. Nitric oxide (NO) removal efficiency thus falls off in direct proportion to the OH concentration.

At high temperatures, nitric oxide conversion also decreases due to the increasing efficiency of NO formation reactions relative to NO removal reactions. Since increased OH is present at these temperatures, an increasing fraction of the available $NH_2$ reacts with OH to produce NH, as opposed to reacting with the NO to produce molecular nitrogen. The resulting NH radicals subsequently follow several different reaction paths which are summarized below:

$$NH + NO \rightarrow N_2 + OH \quad (8)$$

$$NH + NO \rightarrow N_2O + H \quad (9)$$

$$NH + OH \rightarrow HNO + H \quad (10)$$

$$NH + CO_2 \rightarrow HCO + CO \quad (11)$$

$$HCO + NH_2 \rightarrow NO + NH_3 \quad (12)$$

$$HNO + M \rightarrow NO + H + M \quad (13)$$

As several of these paths form NO, the process efficiency is reduced. The net result is that the NO reduction occurs over a moderately narrow temperature range from about 1160° F. to about 1880° F. (900–1300 K.; 620°–1020° C.), and at about 960° C. (1750° F.) under normal diesel operating conditions, as illustrated in FIG. 1. FIG. 1 is a plot of NO removal by the noted reductants versus temperature. The decrease in performance at low temperatures results from decreased formation of $NH_2$ radicals, while at high temperatures, the $NH_2$ radicals can lead to NO formation.

FIG. 1 also shows that other reductants, such as urea ($NH_2CONH_2$) and cyanuric acid ($(HNCO)_3$), work in a similar fashion to $NH_3$, although their detailed chemistry is somewhat different. However, these reductants can also produce iso-cyanate (HNCO) which will react to form the cyano radical NCO. The NCO then reacts with NO to form byproducts, such as nitrous oxide ($N_2O$). This formation of $N_2O$ is a serious negative byproduct of the chemical processes that use these reductants.

Another consequence of the process is the emission ("slip") of some $NH_3$. FIG. 2 shows the relationship between NO removal with urea and $NH_3$ slip. Curve A represents $NH_3$ content in exhaust. Curve B represents the effectiveness of $NO_x$ removal as a function of % $NO_x$ removed. Both components are plotted versus exhaust temperature. As the temperature increases, $NH_3$ slip is reduced. However, $NO_x$ removal peaks at a temperature of about 960° C. (1750° F.) in this example, at which temperature there is still significant $NH_3$ slip. The present invention also provides a means of reducing $NH_3$ slip by operating above the peak temperature for $NO_x$ removal downstream from the initial $NO_x$ reduction zone.

The temperature at which the $NO_x$ removal reactions occur can be lowered by the presence of other species; specifically, species producing OH radicals. Hydrogen ($H_2$) may be used to alter optimum temperatures. As the amount of hydrogen is increased, the temperature for maximum $NO_x$ removal drops from 960° C. (1760° F.) to 700° C. (1290° F.). This occurs since $H_2$ produces OH radicals via reaction (6).

In an exhaust with modest amounts of CO and hydrocarbons present, the carbon monoxide and hydrocarbons can initiate a chain branching sequence which consists of the following set of reactions:

$$CO + OH \rightarrow CO_2 + H \quad (14)$$

$$H + O_2 \rightarrow OH + O \quad (15)$$

$$O + H_2 \rightarrow OH + H \quad (16)$$

Thus, in such an exhaust, the peak temperature for selective gas phase $NO_x$ removal occurs at temperatures less than 960° C. The $O_2$ concentration also has a secondary effect on these processes.

One of the difficulties in applying SNCR processes is the availability of appropriate temperatures. For engines such as diesels or gas turbines, exhaust temperatures of about 1000 F are too low to merely inject $NH_3$ or another chemical. Finding the appropriate temperature within the engine cycle is either not feasible, or sufficiently complicates the process to render it inappropriate. In other industrial processes, such as metal or glass melting, refining or incineration, similar situations occur.

One option is to reheat the exhaust gases to a temperature appropriate for the selective gas phase $NO_x$ reduction reactions to occur. However, without heat recovery, this results in a significant energy penalty that will in many cases be intolerable.

Another problem encountered with conventional SNCR is incomplete mixing of the chemical reductant with the exhaust gases during the reduction reaction with the result that significant amounts of $NO_x$ are not removed from the exhaust.

Consequently, a $NO_x$ removal scheme that is energy efficient, cost effective, eliminates catalyst replacement, improves reductant distribution, and directly decomposes $NO_x$ to $N_2$ and $H_2O$ is urgently needed.

Accordingly, an object of the present invention is to provide an SNCR process for $NO_x$ that provides complete mixing of $NO_x$ reductant with exhaust gases prior to $NO_x$ reduction.

It is a further object of the present invention to provide an SNCR process for $NO_x$ with reduced energy consumption.

It is yet another object of the present invention to provide an SNCR process for $NO_x$ that eliminates the $N_2O$ and other byproduct emissions and $NH_3$ slip associated with SNCR.

It is still another object of the present invention to provide an SNCR process for $NO_x$ with no external fuel or heating requirements.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the claims.

SUMMARY OF THE INVENTION

The present invention is directed to a process for removal of oxides of nitrogen from combustion exhaust gases comprising injecting an oxide of nitrogen reductant into combustion exhaust gases to form a mixture with the oxides of nitrogen at a temperature below that effective for reduction of the oxides of nitrogen, heating the mixture to a temperature effective for reduction of the oxides of nitrogen, and reacting the mixture to form reacted exhaust gases having reduced oxides of nitrogen content.

The invention is also directed to using heat energy from the reacted exhaust gases to reduce the energy consumption of the required heating, and to the destruction of byproduct emissions, such as $N_2O$, and unreacted reductant by further heating.

In a particular embodiment of the invention, the exhaust gases and reductant are mixed and then heated with the heat of a previously heated exhaust using a recuperative heat exchanger. The resulting mixture is reacted to reduce $NO_x$, then further heated to remove byproducts and reductant slip by self-ignition of additional fuel added to the mixture prior to heating, or by an external burner, and finally cooled by transfer of heat to the recuperative heat exchanger.

In a second embodiment of the invention, the exhaust gases and reductant are mixed and then heated with the heat of a previously heated exhaust using a regenerative heat exchanger. The resulting mixture is reacted to reduce $NO_x$, then further heated to remove byproducts and reductant slip by self-ignition of additional fuel added to the mixture prior to heating, or by an external burner, and finally cooled by transfer of heat to the regenerative heat exchanger.

In a third embodiment of the invention, the exhaust gases and reductant are mixed and then heated by compression. The resulting mixture is reacted to reduce $NO_x$, then further heated to remove byproducts and reductant slip by self-ignition of additional fuel added to the mixture prior to heating, or by an external burner, and finally cooled by expansion, the heat being converted to shaft power to drive the compression heating.

In a fourth embodiment of the invention, radicals of a reductant are generated by an electric discharge. The radicals are then injected into the exhaust at high velocity to enhance mixing and the reduction of $NO_x$.

BRIEF DESCRIPTION OF THE DRAWINGS

The accompanying drawings, which are incorporated in and constitute a part of the specification, schematically illustrate aspects of the invention and, together with the general description given above and the detailed description of the preferred embodiments given below, serve to explain the principles of the invention.

FIG. 5A is a schematic representation of an $NO_x$ reduction process using a reactor incorporating a compressor and a turbine.

FIG. 5B is a graphical representation of a numerical model of $NO_x$ removal using a compressor and a turbine corresponding to FIG. 5A.

DETAILED DESCRIPTION OF THE INVENTION

Figure 1:
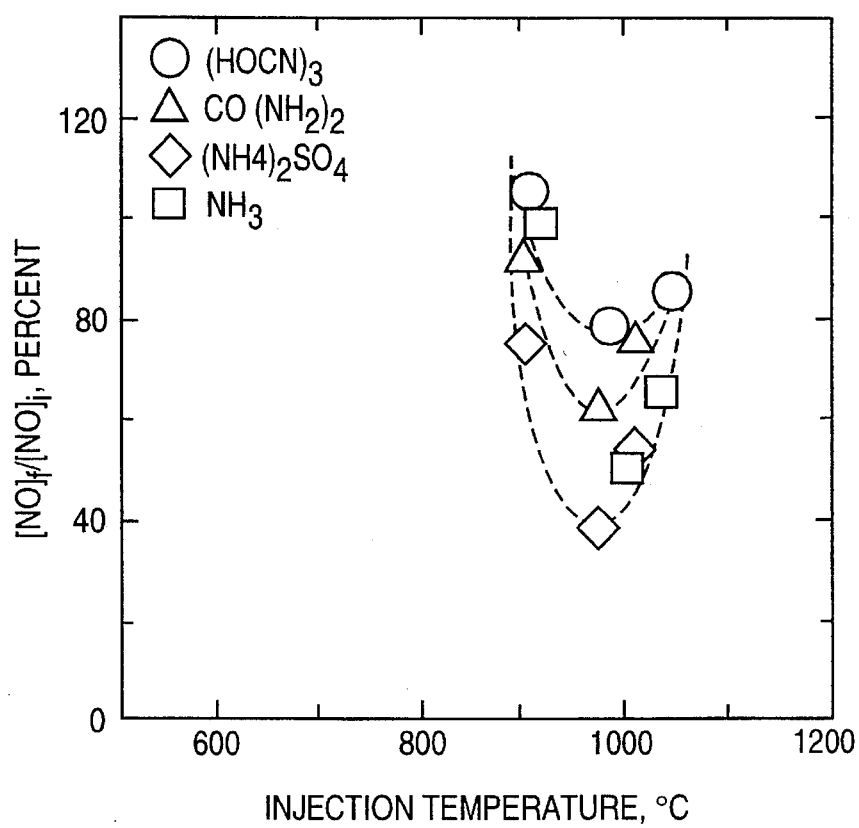
FIG. 1 is a graph of the effect of temperature and reductant on nitric oxide removal at N/NO ratio of 1.5 with base NO concentration of 240 ppm.
Figure 2:
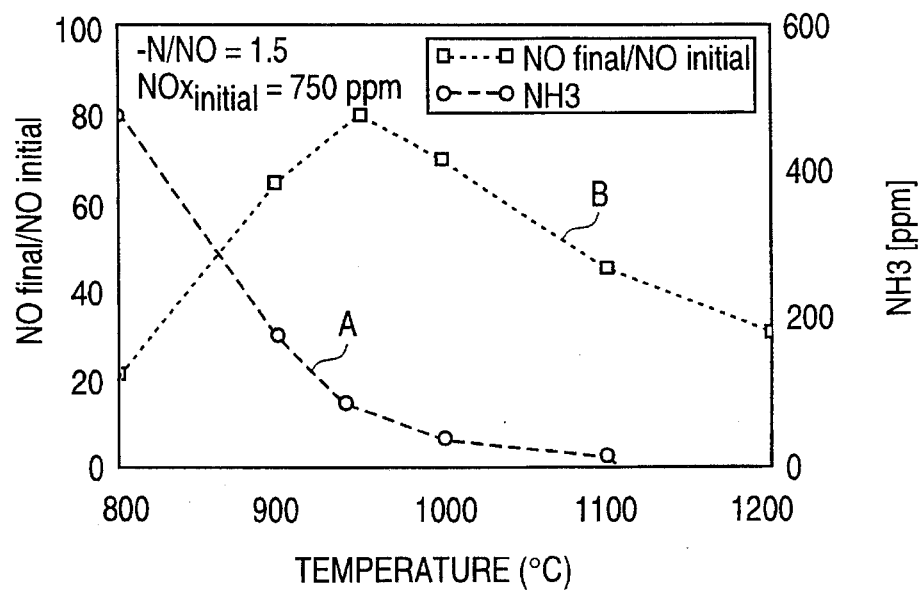
FIG. 2 is a graph of the effect of temperature on $NO_x$ removal and $NH_3$ slip when urea is used as a reductant.

The present invention provides an advanced selective non-catalytic $NO_x$ reduction process that has a number of advantages over current technologies: It decouples SNCR from the furnace, making it a true "post-combustion" process and therefore a stand alone system can be mass produced. It provides a $NO_x$ control technique for industrial processes not amenable to current approaches, such as glass and metal melting furnaces, refineries, incinerators, and lean reciprocating engines, such as diesel. It eliminates the problems of mixing SNCR chemicals with the combustion products since the chemicals are mixed first, then reacted. Furthermore, it provides a means to reduce byproduct species emissions, such as nitrous oxide ($N_2O$) and unreacted reductant, such as ammonia ($NH_3$). Finally, it provides a means of reusing the heat of reacted exhaust to heat exhaust gas-reductant mixtures.

The invention is not specific to a particular reductant. Reductants useful in the practice of the invention include ammonia ($NH_3$), urea, cyanuric acid, iso-cyanate, hydrazine, ammonium sulfate, atomic nitrogen, malamine, and bi-urates.

Generally, the exhaust gases from the combustion source enter a reducing reactor at about 1000° F. (800 K). A $NO_x$ reductant is injected into the exhaust to form a mixture. The mixture is then heated to about 1750° F. (1170 K) by regenerative heating means to effect the $NO_x$ reduction reactions.

Reaction temperatures may vary as a function of the exhaust composition. Temperatures recited are for normal diesel operation. As noted above, increased carbon monoxide (CO) or hydrogen ($H_2$) content in the exhaust reduces reaction temperatures.

The process of the invention can also reduce unreacted reductant, termed "slip". By injecting the reductant, such as ammonia ($NH_3$) at the heat exchanger inlet, the gases are mixed, heated and then reacted at about 1750° F. If the gases are heated further, to a temperature of about 2000° F. following completion of the $NO_x$ reduction, residual $NH_3$ is consumed.

This "overheat" removes not only the $NH_3$ slip, but also any nitrous oxide ($N_2O$) or other such byproducts that may be formed by $NO_x$ reduction reactions. Since $N_2O$ is thermally unstable at temperatures above 2000° F., when the regenerative heat exchanger is run at higher temperatures downstream from the initial $NO_x$ reduction reaction zone, the $N_2O$ produced by the reduction reactions will dissociate to $N_2$ and O.

Such overheating may be accomplished by the injection of additional fuel during mixing of the reductant and exhaust gases. The additional fuel self-ignites upon regenerative heating to provide the additional heat necessary for $NH_3$ and $N_2O$ removal during or following the $NO_x$ reduction reactions.

Alternatively, overheating may be achieved by operating an external heating means, such as a burner, in the reactor. By operating the burner slightly fuel rich, the added combustion products will also contain some CO and $H_2$, producing the corresponding enhancement of the $NO_x$ removal process, that is, allowing the reduction reactions to take place at lower temperatures. During the process both CO and $H_2$ are consumed.

Following $NO_x$ reduction and removal of reaction byproducts and $NH_3$ slip, the heat of reacted exhaust is used to heat the incoming mixture before being exhausted to the atmosphere.

An electrical dicharge may also be used to generate radicals for $NO_x$ reduction. The radicals are injected into an exhaust stream at sufficient velocity to achieve substantially complete mixing with the exhaust gases and reduction of $NO_x$ without additional heating.

Figure 3A:
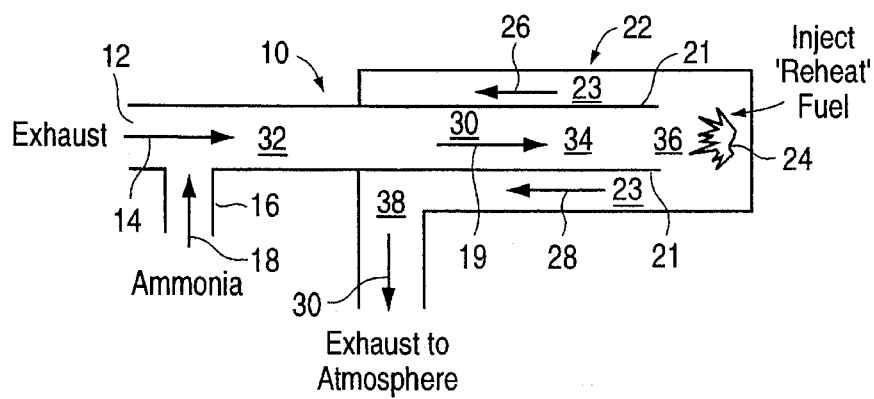
FIG. 3A is a schematic representation of an $NO_x$ reduction process using a reactor incorporating a counter-current heat exchanger.

The invention will be described in terms of several preferred embodiments, as illustrated by FIGS. 3A–6B. Referring to FIG. 3A, a first embodiment of the present invention is shown. Exhaust gases from a combustion engine (not shown) enter reactor 10 through port 12 as shown by arrow 14. A reductant, such as ammonia, is injected into reactor 10 through injector 16 as shown by arrow 18. The exhaust gases and reductant proceed through reactor 10, propelled by the engine exhaust, as indicated by arrow 19, becoming thoroughly mixed. In this way, mixing can occur as the gases heat up with reactions occurring once mixing is complete. Accordingly, the process avoids one of the major challenges of SNCR of $NO_x$—mixing of the chemicals simultaneous with the reactions.

Reactor 10 incorporates counter-current heat exchanger 22. As the mixture of exhaust gases and reductant proceeds through reactor 10, it enters upstream portion 20 of heat exchanger 22 and is heated through interior walls 21 of heat exchanger 22 by heat exchange with previously heated exhaust located in downstream portion 23 of heat exchanger 22. As the mixture is heated, $NO_x$ reduction reactions occur in the upstream portion 23 of heat exchanger 22.

The reacted mixture is then further heated by an external burner 24 to complete $NO_x$ reduction and to remove byproduct, such as $N_2O$, and $NH_3$ slip. As noted above, this further heating can also be accomplished by self-ignition of additional fuel injected during mixing, without the need for a external burner or other external heating source. After reaction, the reacted gases transfer their heat to the incoming mixture in upstream portion 20 of heat exchanger 22 through walls 21 of heat exchanger 22 and then exhaust to the atmosphere, as shown by arrows 26, 28 and 30.

Figure 3B:
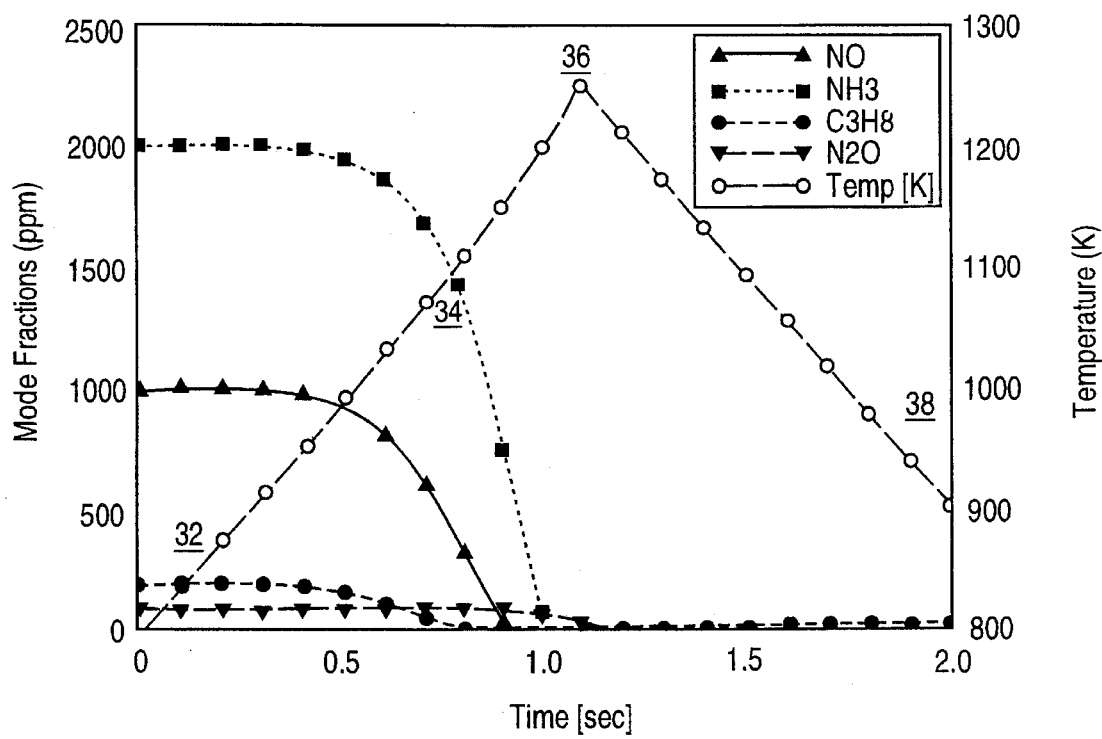
FIG. 3B is a graphical representation of a numerical model of $NO_x$ removal using a counter-current heat exchanger corresponding to FIG. 3A.

FIG. 3B shows a representative profile of the mixture components nitric oxide (NO), ammonia ($NH_3$), hydrocarbon ($C_3H_8$), and nitrous oxide ($N_2O$) as mole fractions (mole of component/mole of mixture) in parts-per-million, relative to temperature (Kelvin) as the mixture proceeds through the reaction reactor 10. Reference numbers 32, 34, 36 and 38 provide correspondence between the stage of the process shown in the schematic of FIG. 3A and the point along the time axis of the graph of FIG. 3B. The graph shows the removal of NO, and then $C_3H_8$, $NO_2$ and $NH_3$ as the temperature increases, followed by the decrease in temperature as a result of heat exchange.

Figure 4A:
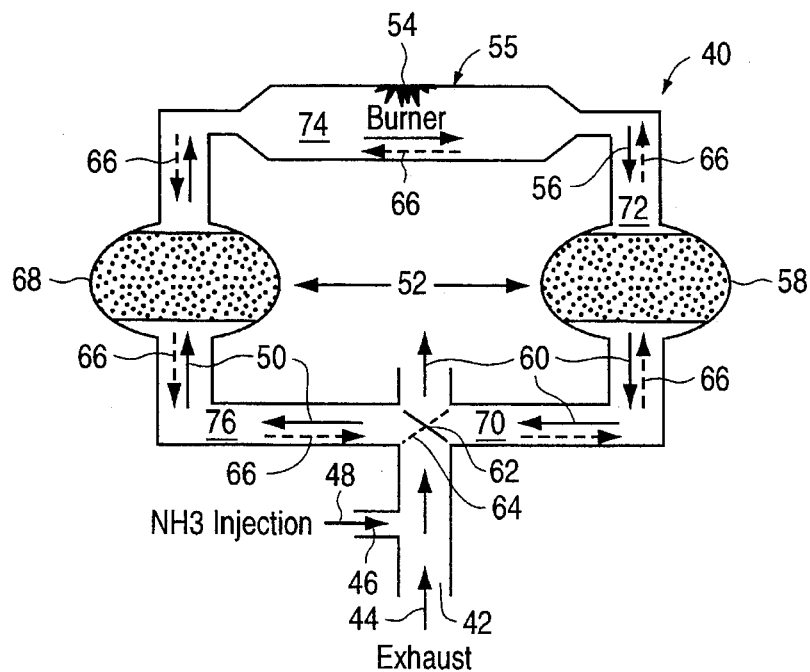
FIG. 4A is a schematic representation of an $NO_x$ reduction process using a reactor incorporating a regenerative heat exchanger.

Referring to FIG. 4A, a second embodiment of the present invention is shown. Exhaust gases from a combustion source (not shown) enter reactor 40 through port 42 as shown by arrow 44. A reductant, such as ammonia, is injected into reactor 40 through injector 46 as shown by arrow 48. The exhaust gases and reductant proceed through reactor 40, propelled by the engine exhaust as indicated by arrows 50, becoming thoroughly mixed.

Reactor 40 incorporates a regenerative heat exchanger 52. Regenerative heat exchangers are routinely used in industry and can be designed with energy recoveries up to 95%. As exhaust gas/reductant mixture first begins to flow through reactor 40, it is heated only by external burner 54 in reaction chamber 55. As the mixture is heated, nitric oxide reduction reactions take place and byproduct, such as $N_2O$, and $NH_3$ slip are removed.

Following reaction, the exhaust gases proceed, as shown by arrow 56 from reaction chamber 55 to first regenerative chamber 58. Heat from the reacted exhaust gases is collected in a heat exchange substrate, such as checker, or pebble bed of first regenerative chamber 58. The cooled reacted exhaust gases then proceed, as shown by arrows 60, to exit the reactor to the atmosphere.

After the reactor has been in operation for a period of time, generally one to five minutes, sufficient for the reacted exhaust gases to heat the heat exchange substrate of first regenerative chamber 58 to about the temperature at which they enter regenerative chamber 58, valve 62 is turned to the position shown by broken line 64 which causes a reversal of the flow in reactor 40, as shown by arrows 66 (in phantom). As a result, the mixture proceeds through reactor 40, first entering first regenerative chamber 58 and being heated by the heat exchange substrate, before proceeding to reaction chamber 55 where $NO_x$ reduction reactions occur prior to further heating by external burner 54 for removal of $N_2O$ and other byproducts, and $NH_3$ slip. As with the previous embodiment, this further heating can also be accomplished by injection of additional fuel during mixing, without the need for a external burner or other external heating source once the reactor has reached its operating temperature. The reacted exhaust then enters second regenerative chamber 68 where heat from the reacted exhaust gases is collected in a heat exchange substrate. The cooled reacted exhaust gases then proceed, as shown by arrows 66 to exit the reactor to the atmosphere.

The direction of flow through reactor 40 is periodically reversed, again approximately every one to five minutes, by turning valve 62 to optimize the regenerative heating of the exhaust.

Figure 4B:
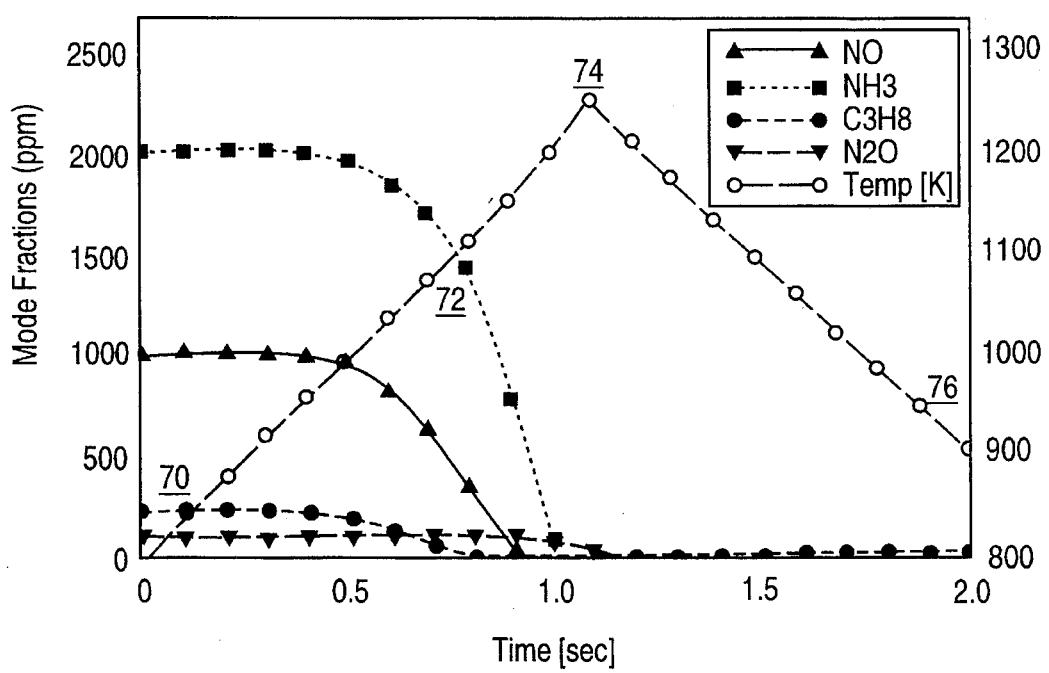
FIG. 4B is a graphical representation of a numerical model of $NO_x$ removal using a regenerative heat exchanger corresponding to FIG. 4A.

FIG. 4B shows a representative profile of the mixture components nitric oxide (NO), ammonia ($NH_3$), hydrocarbon ($C_3H_8$), and nitrous oxide ($N_2O$) as mole fractions (mole of component/mole of mixture) in parts-per-million, relative to temperature (Kelvin) as the mixture proceeds through the reactor 40. Reference numbers 70, 72, 74 and 76 provide correspondence between the stage of the process shown in the schematic of FIG. 4A and the time axis of the graph of FIG. 4B. The graph shows the removal of NO, and then $C_3H_8$, $NO_2$ and $NH_3$ as the temperature increases, followed by the decrease in temperature as a result of heat exchange.

Figure 4C:
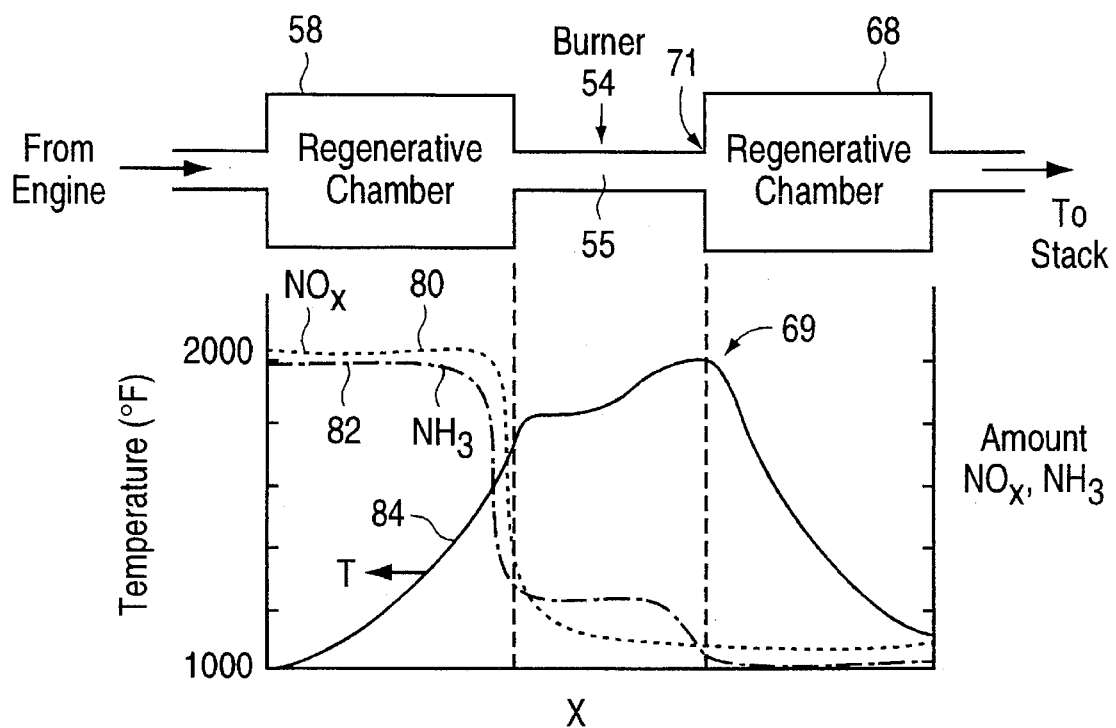
FIG. 4C is a parallel schematic/graphical representation of $NO_x$ removal using a regenerative heat exchanger.

Referring to FIG. 4C, regenerative chambers 58 and 68, and reaction chamber 55 of the embodiment shown in FIG. 4A are shown parallel to a graphed representative profile of $NO_x$ 80 and $NH_3$ 82 levels or amounts plotted against the temperature 84 in the reactor. Distance along the horizontal X-axis of the graph corresponds to distance in regenerative chambers 58 and 68, and burner 55. For example, a temperature 69 shown on the graph corresponds to the temperature of the reacted exhaust at the entrance 71 to regenerative chamber 68, which is vertically aligned with temperature 69. In the example shown, the exhaust gases are mixed with reductant, then heated and then reacted at about 1750° F. The reacted exhaust is heated further to a peak temperature of 2000° F. following completion of the $NO_x$ reduction to consume residual $NH_3$. The $NO_x$ reduction reactions occur within the heat exchanger surfaces, and residual $NH_3$ is consumed as the gases continue to heat up to 2000° F. Byproduct $N_2O$, not represented in the figure, is also dissociated to $N_2$ and O at the peak temperature. Alternatively, potassium hydroxide (KOH) or sodium hydroxide (NaOH) may be added to lower the effective temperature for $N_2O$ dissociaton.

Referring to FIG. 5A, a third embodiment of the present invention is shown. Exhaust gases from a combustion source (not shown) enter reactor 90 through port 92 as shown by arrow 94. A reductant, such as ammonia, is injected into reactor 90 through injector as shown by arrow 98. The exhaust gases and reductant proceed through reactor 90, as indicated by arrow 99, becoming thoroughly mixed. In this way, mixing can occur as the gases heat up with reactions occurring once mixing is complete. Like the previously described embodiments, the process avoids one of the major challenges of SNCR of $NO_x$—mixing of the chemicals simultaneous with the reactions.

Reactor 90 incorporates a compressor 100. As the mixture of exhaust gases and reductant proceeds through reactor 90, it enters compressor 100 and is heated by compression therein. As the mixture is heated, $NO_x$ reduction reactions take place.

From the compressor 90, the reacted exhaust proceeds to reaction chamber 102 where it is further heated by external burner 104 to complete $NO_x$ reduction and to remove byproducts, such as $N_2O$, and $NH_3$ slip. Again, this further heating can also be accomplished by injection of additional fuel during mixing, without the need for a external burner or other external heating source. After reaction, the reacted gases proceed to turbine 106 where they expand, converting their enthalpy to shaft energy to drive the compressor 100 connected to turbine 106 by shaft 107. The reacted exhaust is the exhausted to the atmosphere, as shown by arrow 108.

FIG. 5B shows a representative profile of the mixture components nitric oxide (NO), ammonia ($NH_3$), and nitrous oxide ($N_2O$) as mole fractions (mole of component/mole of mixture) in parts-per-million, relative to temperature (Kelvin) as the mixture proceeds through the reactor 90. Reference numbers 110, 112, 114 and 116 provide correspondence between the stage of the process shown in the schematic of FIG. 5A and the point along the time axis of the graph of FIG. 5B. The graph shows the removal of NO, and then $N_2O$ and $NH_3$ as the temperature increases, followed by the decrease in temperature as a result of expansion through the turbine 106.

Figure 6A:
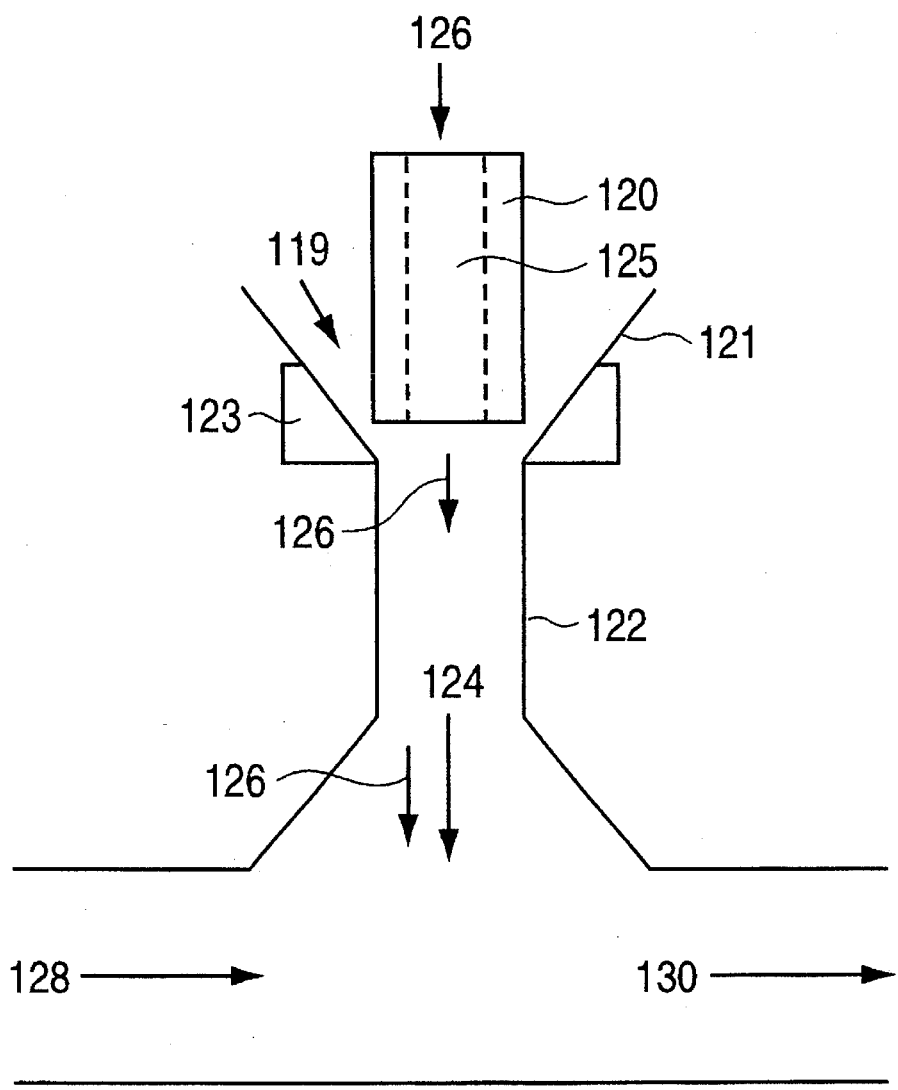
FIG. 6A is a schematic representation of an $NO_x$ reduction process using a high velocity radical-generating electric discharge.

Referring to FIG. 6A, a fourth embodiment of the invention is shown. This embodiment does not use thermal heating to reduce $NO_x$, but instead uses an electric discharge to generate radicals from a reductant, shown by arrow 119, fed through an electric discharge. The discharge is in the form of a steady or rotating electric arc from a cathode 120 to an anode 121. The polarity of the electrodes may also be reversed. A stationary magnet 123 is provided in order to generate a rotating arc. The radicals formed are then injected into unheated exhaust gases as shown by arrow 124. To improve the mixing with exhaust gases 124, the radicals are accelerated to supersonic velocities prior to injection by expansion through a converging-diverging nozzle 122. Expansion also achieves rapid cooling of the radicalized reductant which improves the efficiency of the $NO_x$ reduction reactions.

To improve the economy of the process, a gas shown by arrow 126, such as air, is injected into exhaust gases 124 with the radicals. The gas is supplied by a conduit 125 (shown in phantom) running through the center of cathode 120. Gas 126 is injected at a velocity sufficient to provide mixing of the radicals with the main exhaust gases 128 flowing from a combustion source (now shown). The resulting treated exhaust shown by arrow 130 then exits the system.

Figure 6B:
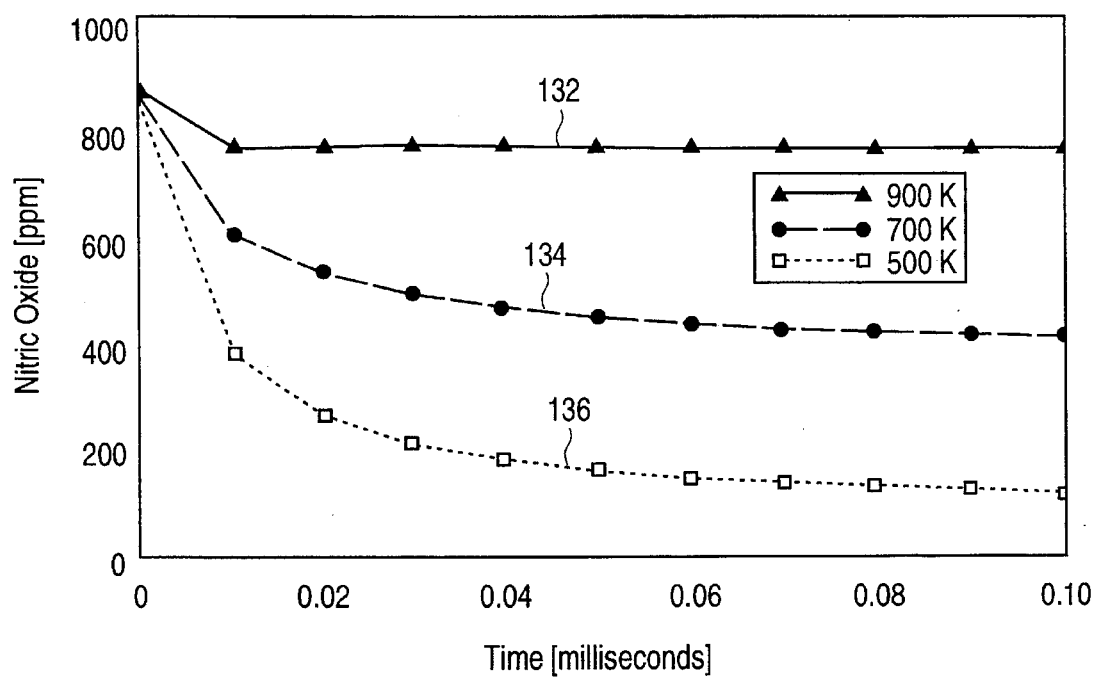
FIG. 6B is a graphical representation of a numerical model of $NO_x$ removal using high velocity radical generating electric discharge corresponding to FIG. 6A.

FIG. 6B shows representative profiles of temperature and $NO_x$ content for the process of 6B. The lines on the graph from top to bottom, lines 132, 134 and 136, show the decrease in $NO_x$ content achieved at successively lower temperatures. The plot illustrates the advantage, achieved by the process, of low temperature $NO_x$ reduction.

In summary, an improved process for SNCR of $NO_x$ has been described. Exhaust gases from a combustion source may be fed to a reducing reactor. A $NO_x$ reductant is injected into the exhaust to form a mixture. The mixture may then be heated by regenerative heating to effect $NO_x$ reduction reactions. The reacted exhaust may then be further heated to remove byproducts, such as $N_2O$, and unreacted reductant.

The present invention has been described in terms of preferred embodiments. The invention, however, is not limited to the embodiments depicted and described. Rather, the scope of the invention is defined by the appended claims.

What is claimed is:

1. A selective non-catalytic process for removal of oxides of nitrogen from combustion exhaust gases, comprising:

(a) injecting a reductant for oxides of nitrogen into the combustion exhaust gases to form a mixture at a temperature below that effective for reduction of the oxides of nitrogen;

(b) heating the mixture to a temperature effective for reduction of the oxides of nitrogen such that the mixture forms reacted exhaust gases having a reduced content of oxides of nitrogen; and (c) transferring heat from the reacted exhaust gases to heat the mixture according to step (b);

wherein steps (a) and (b) are carried out in the absence of a catalyst.

2. The process of claim 1, wherein the heat energy from the reacted exhaust gases is transferred to the mixture using a heat exchanger.

3. The process of claim 2, wherein the heat exchanger is a recuperative heat exchanger.

4. The process of claim 3, wherein the recuperative heat exchanger is a counter-current heat exchanger.

5. The process of claim 2, wherein the heat exchanger is a regenerative heat exchanger.

6. The process of claim 1, wherein the heat energy from the reacted exhaust gases is converted to shaft energy and then used to drive a compressor to heat the mixture according to step (b) by compression.

7. A selective non-catalytic process for removal of oxides of nitrogen from combustion exhaust gases, comprising:

(a) injecting a reductant for the oxides of nitrogen into the combustion exhaust gases to form a mixture at a temperature below that effective for reduction of the oxides of nitrogen;

(b) heating the mixture to a temperature effective for reduction of the oxides of nitrogen such that the mixture forms reacted exhaust gases having a reduced content of oxides of nitrogen; and (c) transferring heat from the reacted exhaust gases to heat the mixture according to step (b) using a heat exchanger;

wherein steps (a) and (b) are carried out in the absence of a catalyst.

8. A selective non-catalytic process for removal of oxides of nitrogen from combustion exhaust gases comprising:

(a) injecting a reductant for the oxides of nitrogen into the combustion exhaust gases to form a mixture at a temperature below that effective for reduction of the oxides of nitrogen;

(b) compressing the mixture to increase its temperature to that effective for reduction of the oxides of nitrogen such that the mixture forms reacted exhaust gases having a reduced content of oxides of nitrogen;

(c) converting heat energy of the reacted exhaust gases to shaft energy; and (d) using the shaft energy to drive a compressor to heat the mixture according to step (b);

wherein steps (a) and (b) are carried out in the absence of a catalyst.

9. The process of claim 1, 2, 3, 4, 5, 6, 7, or 8, further comprising:

further heating the reacted exhaust gases following step (b) to a temperature effective for the destruction of reducing reaction byproducts and unreacted reductant in the reacted exhaust gases.

* * * * *